Patented Apr. 4, 1950

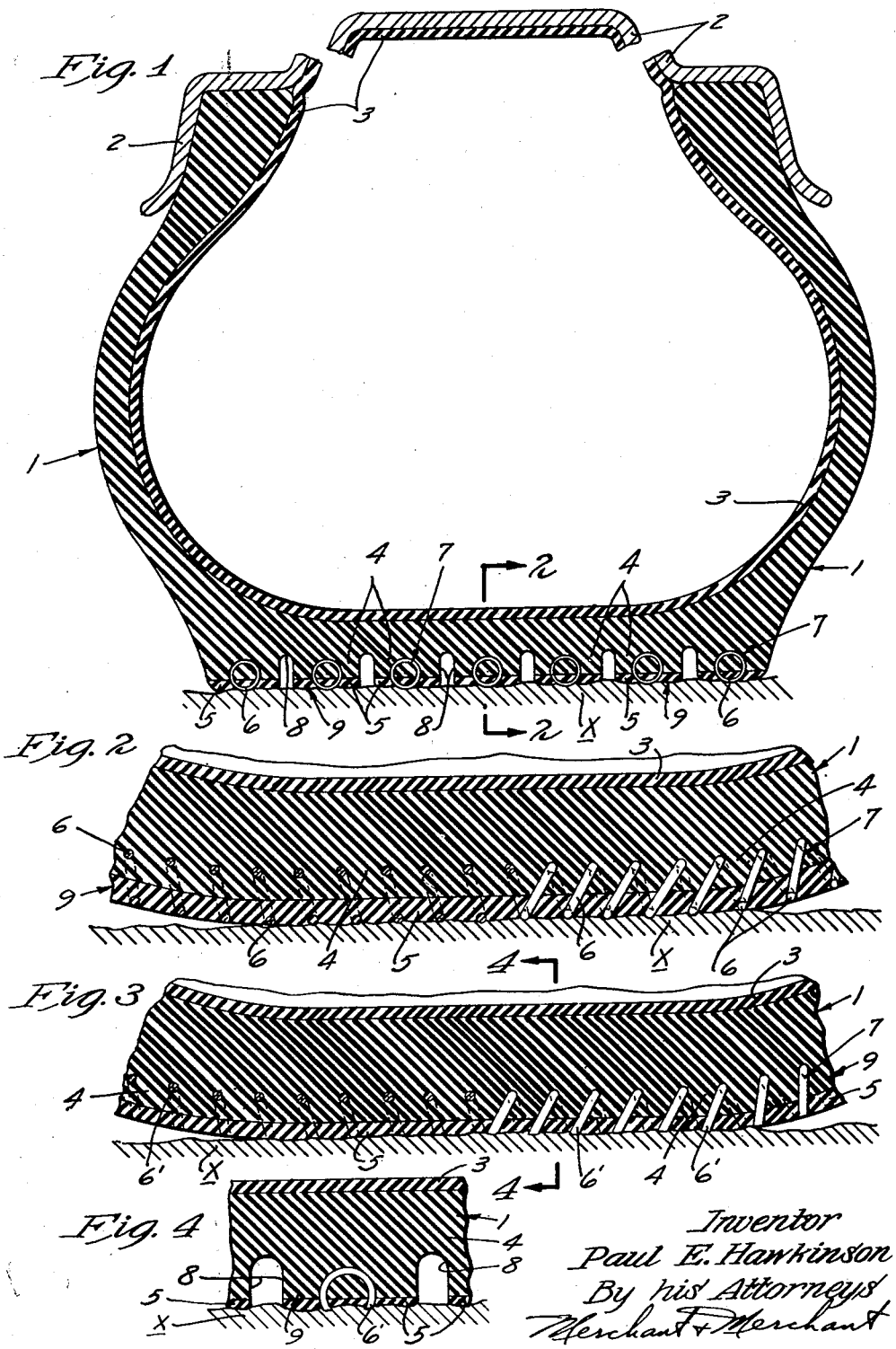

2,502,521

UNITED STATES PATENT OFFICE 2,502,521

TIRE TREAD

Paul E. Hawkinson, Minneapolis, Minn., assignor to Paul E. Hawkinson Company, Minneapolis, Minn., a corporation of Minnesota Application May 3, 1948, Serial No. 24,710

1 Claim. (Cl. 152—211)

My invention relates to treads for pneumatic tires and, more specifically, to such treads having imbedded therein metal particles or other substances to impart thereto additional traction or non-skid qualities.

Treads for pneumatic tires are formed from rubber-like materials which tend to become relatively hard and less resilient at low temperatures. Traction-producing elements, such as metallic claws or the like imbedded in such rubber, are deemed most essential and desirable on slippery and icy roads in cold weather. However, I have found that, because of the hardness of the rubber from which the conventional treads are formed, the metal claws are rendered less effective during low temperatures because the rubber in which the claws are imbedded refuses to yield or be displaced so as to allow the claws to project radially outwardly therefrom sufficiently to dig into the ice or other road surfaces.

The primary object of my invention is the provision of a tread having imbedded therein a plurality of circumferentially spaced metal claws or other traction elements which project generally radially of the axis of rotation of the tire with the inner ends of said elements or claws being anchored in a layer of relatively hard rubber and the radially outer end portions thereof being imbedded in a layer of relatively soft rubber. With this novel arrangement, I have found that because of the relative ease with which the softer layer of rubber is made to yield or be displaced at any given temperature, the claws or traction elements are rendered more effective.

The above and still further objects and advantages of my invention will become apparent from the following detailed specification, appended claim, and attached drawings.

Referring to the drawings, wherein like characters indicate like parts throughout the several views:

Fig. 1 is a cross section of a rim-mounted pneumatic tire, illustrating my invention as applied thereto, some parts being broken away;

Fig. 2 is an enlarged fragmentary section, taken on the line 2—2 of Fig. 1;

Fig. 3 is a view corresponding to Fig. 2, illustrating the tire of Figs. 1 and 2 in a worn condition; and Fig. 4 is a fragmentary detail in section, taken on the line 4—4 of Fig. 3.

Referring with greater particularity to the drawings, the numeral 1 indicates, in its entirety, a pneumatic tire mounted on a rim 2. The rim may be of any conventional type but, as shown, is of the drop center type. An inner tube is indicated at 3.

The tread or road engaging portion of the tire 1 comprises a relatively thick layer of rubber-like material or rubber 4 and a relatively thin layer of rubber-like material or rubber 5. The layers 4 and 5 extend continuously about the circumference of the tire with the layer 5 overlying the relatively thick layer 4. The layer 4 is made of ingredients including abrasives which will give a hardness approximating that of the conventional tire tread; whereas, the layer 5 is formed from relatively softer curing, more readily displaceable material.

I provide anti-skid elements in the nature of claws 6 which are made from steel or other hard or relatively rigid material and which, as shown, are formed from endless coils 7 which extend circumferentially of the tire 1. As indicated in Fig. 1, the tire is grooved, as indicated at 8, to form laterally-spaced circumferentially-extended ribs 9. A circumferentially-extended coil 7 is imbedded in each of the ribs 9 and each convolution of the coil 7 forms a claw element 6. The greater portion of each claw element 6 is anchored in the layer of greater hardness 4 and extends generally radially outwardly of the tire 1 into the layer of less hardness 5 to the outer circumferential surface thereof.

Figs. 1 and 2 illustrate the action of the claw element 6 upon a road surface $x$. The weight of the vehicle borne by the wheel-equipped tire 1 causes the layer of relatively soft rubber 5 to become partially displaced, whereby to allow the claw elements 6 to engage the road surface $x$ and, in instances where such surface is covered by ice and the like, the claw elements 6 tend to dig thereinto and provide adequate traction for the vehicle.

When the tire 1 has been in use sufficiently to cause appreciable wear on the tread thereof, the coils 7 become worn to a degree where a plurality of U-shaped claws 6' are formed. The layer of relatively soft rubber 5 is displaced as hereinbefore described when contact with the ground is made thereby and the free ends of each claw 6' are enabled to dig into the ground surface $x$ to aid in the traction of the tire. The layer 4 of rubber of relatively greater hardness firmly anchors the central portions of each claw 6' so that the claws 6' do not work loose from the tire during the use thereof.

My invention has been thoroughly tested and found to be adequate for the accomplishment of the objectives set forth; and while I have shown and described a single embodiment of my invention, it will be understood that the same is capable of modification without departure from the scope and spirit of the invention as defined in the claim.

What I claim is:

An anti-skid tread for pneumatic tires and the like comprising a circumferentially extended inner layer of relatively hard rubber tread material, an outer layer of relatively soft rubber tread material overlying said first layer and united thereto to provide the road engaging surface of the tread, and a plurality of relatively rigid traction claws embedded in said tread, said claws extending generally radially of the tire with a major portion thereof anchored in and supported by said first mentioned layer and the remainder thereof extending through said last mentioned layer, whereby to cause said claws to project from said tread and grip the road under loaded condition of a tire.

PAUL E. HAWKINSON.

REFERENCES CITED

The following references are of record in the file of this patent:

UNITED STATES PATENTS

| Number | Name | Date |
|---|---|---|
| 951,871 | Wirt | Mar. 15, 1910 |
| 1,740,616 | Midgley | Dec. 24, 1929 |
| 2,006,038 | Yamaki | June 25, 1935 |